(12) United States Patent
Rajasekaran

(10) Patent No.: US 11,365,854 B1
(45) Date of Patent: Jun. 21, 2022

(54) SOLAR LIGHT WITH POSITIONABLE PANELS

(71) Applicant: E. MISHAN & SONS, INC., New York, NY (US)

(72) Inventor: Mohan Rajasekaran, Watertown, CT (US)

(73) Assignee: E. Mishan & Sons, Inc., New York, NY (US)

( * ) Notice: Subject to any disclaimer, the term of this patent is extended or adjusted under 35 U.S.C. 154(b) by 0 days.

(21) Appl. No.: 17/484,588

(22) Filed: Sep. 24, 2021

(51) Int. Cl.
| | |
|---|---|
| *F21S 9/03* | (2006.01) |
| *F21V 23/04* | (2006.01) |
| *F21V 14/02* | (2006.01) |
| *F21V 21/26* | (2006.01) |
| *F21V 21/08* | (2006.01) |
| *F21Y 105/16* | (2016.01) |
| *F21Y 115/10* | (2016.01) |

(52) U.S. Cl.
CPC .............. *F21S 9/037* (2013.01); *F21V 14/02* (2013.01); *F21V 21/0824* (2013.01); *F21V 21/26* (2013.01); *F21V 23/0464* (2013.01); *F21V 23/0471* (2013.01); *F21Y 2105/16* (2016.08); *F21Y 2115/10* (2016.08)

(58) Field of Classification Search
CPC .......... F21S 9/037; F21V 14/02; F21V 21/26; F21V 21/0824; F21V 23/0471
See application file for complete search history.

(56) References Cited

U.S. PATENT DOCUMENTS

| | | |
|---|---|---|
| 7,131,753 B1 | 11/2006 | Edwards, Jr. |
| 7,407,304 B2 | 8/2008 | Tasson et al. |
| D578,695 S | 10/2008 | Zheng et al. |
| D578,696 S | 10/2008 | Wang et al. |
| 7,556,398 B2 | 7/2009 | Van Der Poel |
| 7,980,738 B2 | 7/2011 | Chiang |
| 8,047,682 B2 | 11/2011 | Zheng et al. |
| 8,072,123 B1 | 12/2011 | Han |
| 8,092,047 B2 | 1/2012 | Ma et al. |
| 8,109,660 B2 | 2/2012 | Hochstein et al. |
| 8,534,884 B2 | 9/2013 | Lui |
| 8,845,132 B2 | 9/2014 | Flaherty et al. |
| 8,882,297 B2 | 11/2014 | Flaherty et al. |
| 8,960,946 B2 * | 2/2015 | Richards ............... F21L 4/08 362/276 |
| 9,328,911 B2 | 5/2016 | Chen et al. |
| 9,677,728 B2 * | 6/2017 | Toner .................. F21S 9/032 |
| 9,732,951 B2 | 8/2017 | Guercio et al. |

(Continued)

*Primary Examiner* — Ismael Negron
(74) *Attorney, Agent, or Firm* — Notaro, Michalos & Zaccaria P.C.

(57) ABSTRACT

A lighting apparatus includes a central hub, and four panels hingedly attached to each side of the hub. Three panels have an LED array each. The fourth panel houses an array of solar cells, an ON/OFF switch, a rechargeable battery, and electronics. The four panels are independently positionable with respect to the hub. A motion detector is configured to operate the apparatus such that when motion is detected, the switch is in the ON position, and the solar cells do not detect ambient light above a predetermined base level, the device electronics turn the LEDs on; and when motion is not detected for a predetermined period, or the switch is in the OFF position, or the solar cells detect ambient light above the predetermined base level, the LEDs are powered off.

6 Claims, 5 Drawing Sheets

(56) References Cited

U.S. PATENT DOCUMENTS

| | | | |
|---|---|---|---|
| 9,874,326 B1 * | 1/2018 | Dai | F21V 7/04 |
| 9,897,302 B2 | 2/2018 | Flaherty et al. | |
| 9,951,931 B1 | 4/2018 | Lan | |
| 9,951,939 B1 | 4/2018 | Lan | |
| 10,001,252 B2 * | 6/2018 | Inskeep | F21L 4/04 |
| 10,094,544 B2 * | 10/2018 | Fang | F21V 21/26 |
| 10,161,575 B2 | 12/2018 | Xiong et al. | |
| 10,274,172 B1 | 4/2019 | Chiu | |
| D861,926 S | 10/2019 | Lin | |
| 10,520,177 B2 * | 12/2019 | Bailey | F21S 8/033 |
| 10,865,980 B1 * | 12/2020 | Tylicki | F21V 23/0471 |
| 11,035,559 B1 * | 6/2021 | Rajasekaran | F21S 2/005 |
| 11,073,266 B2 * | 7/2021 | Zhou | F21V 21/06 |
| 11,231,152 B1 * | 1/2022 | Thompson | G01J 1/0214 |
| 11,280,458 B1 * | 3/2022 | McDonald | F21S 8/03 |
| 2004/0011436 A1 | 6/2004 | Li | |
| 2011/0005143 A1 | 3/2011 | Lin | |
| 2011/0017028 A1 | 7/2011 | Kim | |
| 2014/0030743 A1 | 10/2014 | Santashev et al. | |
| 2017/0029915 A1 | 10/2017 | Luo | |
| 2018/0001077 A1 | 1/2018 | Shim | |
| 2018/0231195 A1 * | 8/2018 | Hoffman | F21V 23/003 |
| 2021/0262635 A1 * | 8/2021 | Li | F21V 1/143 |

* cited by examiner

_US 11,365,854 B1_

SOLAR LIGHT WITH POSITIONABLE PANELS

FIELD AND BACKGROUND OF THE INVENTION

The present disclosure relates generally lighting apparatus, more particularly, solar-powered multi-source lighting apparatus.

SUMMARY OF THE INVENTION

According to an aspect of the subject technology, a solar-powered lighting apparatus comprises multiple panels hingedly attached to a central hub. Each panel has disposed thereon light sources for emitting light, for example light-emitting diodes (LEDs), solar cells for collecting solar energy, or both.

In a non-limiting embodiment, a solar-powered lighting apparatus has the following structure. A central hub has a square profile with four sides, and a panel hingedly attached to each side of the hub, making four panels in total. A first, second, and third of the four panels have LEDs disposed thereon, and have a similar construction. The fourth panel has solar cells disposed thereon. The fourth panel has a larger surface area than each of the first, second, and third panels. An infrared ("IR") emitter/receiver pair is disposed on a front surface of the hub. The four panels are independently positionable with respect to the hub due to their hinged attachment to the hub. The hinged attachment of each of the four panels is adjustable by hand but is stiff enough due to friction in the hinges to maintain each panel in its position as adjusted. Each of the first, second, and third panels can be positioned to project light either downwardly, outwardly or downwardly and outwardly and can be angled at a plurality of angular adjustment positions with respect to the hub in each of the positions. The fourth panel can be positioned to harvest solar energy. In a first position, the four panels and the front surface of the hub are approximately in the same plane, and the overall configuration of the panels and hub is approximately a rectangle. A housing compartment is disposed on the rear surface of the fourth panel. Device electronics and a rechargeable battery are disposed within the housing compartment, and a manual two-position ON-OFF switch is disposed on the housing.

In the same non-limiting embodiment, the device electronics, battery, switch, IR pair, and LEDs are electrically and operatively connected. Wiring for connecting the device electronics to the LEDs and IR pair extends through the hinge connecting the fourth panel to the hub. The wiring further extends from the hub to the LEDs on the respective panels through respective wire insulation sleeves connecting the hub to each of the first, second, and third panels. (In an alternative embodiment, the wiring further extends from the hub to the LEDs through the respective hinges connecting each of the first, second, and third panels to the hub.) A mount is connected to the hub for mounting the device on a wall, ceiling, or other surface.

In the same non-limiting embodiment, under the control of the device electronics, solar energy is harvested by the solar cells and stored in the rechargeable battery for powering the components of the device. When the IR pair detects motion, and the switch is in the ON position, and the solar cells do not detect ambient light above a base level, the device electronics turn the LEDs on. When the IR pair has not detected motion for a predetermined period, or the switch is in the OFF position, or the solar cells detect ambient light above the base level, the LEDs are powered off.

In the same non-limiting embodiment, the mount attached to the hub comprises a mounting bracket comprising a socket, and the hub comprises a stem and ball, the ball being received in the socket for a rotatable and positionable connection of the hub to the underlying surface.

In the same non-limiting embodiment, each of the first, second and the third panels (which may be referred to hereafter as light source panels) comprises a panel body, which is configured to house a printed circuit board (PCB) bearing the LEDs of that panel. The housing is covered by a window disposed over the light emitting devices. The window may be transparent or translucent. The window may be made of glass or plastic.

In the same non-limiting embodiment, each of light source panels is configured to rotate in a range of 0 to 360 degrees, or 0 to 270 degrees, or 0 to 180 degrees, or of 0 to 90 degrees, or of 0 to 45 degrees, relative to the hub.

DETAILED DESCRIPTION OF THE INVENTION

Figure 1:
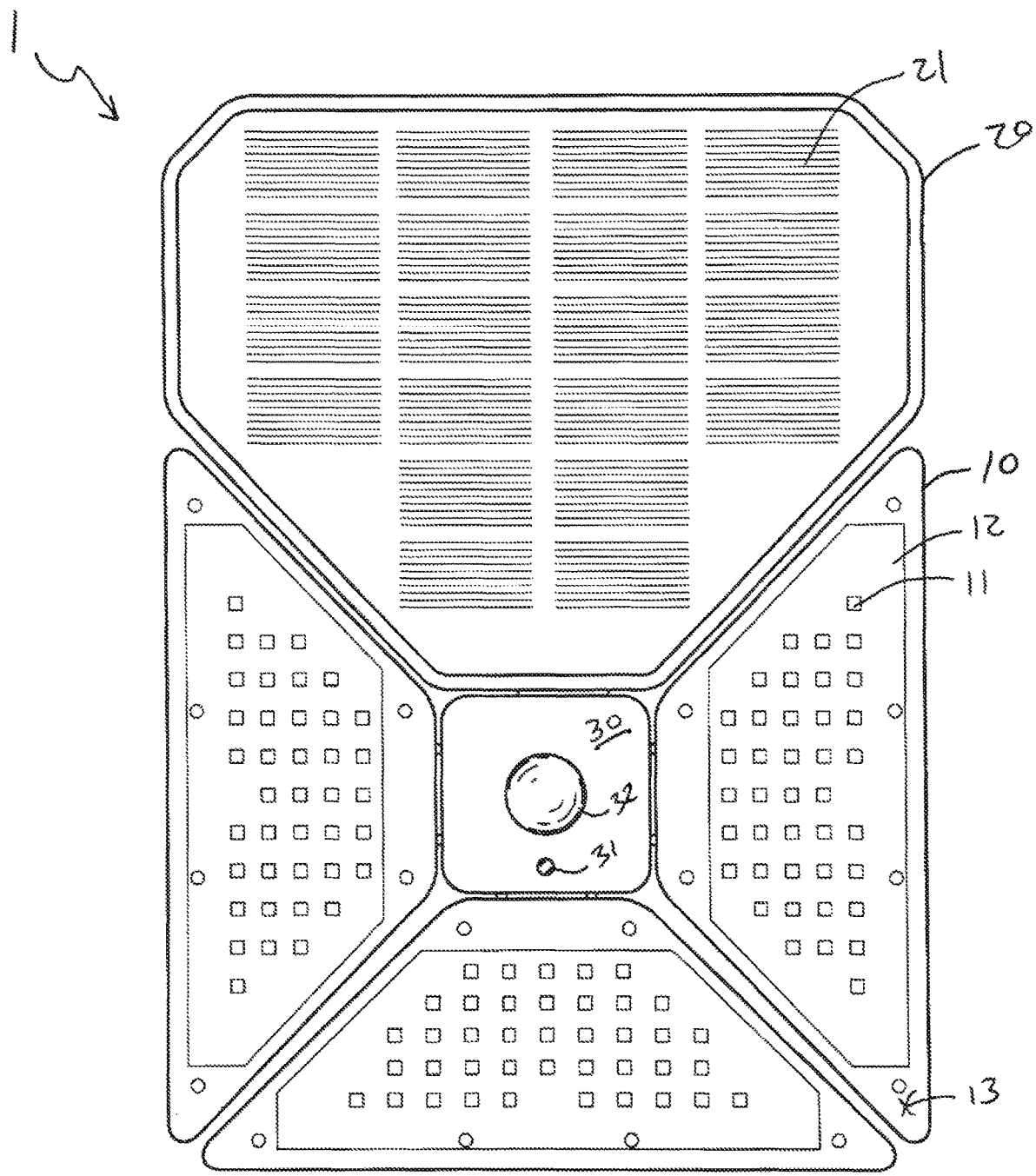
FIG. 1 is a front view of a solar light according to a non-limiting embodiment of the subject technology.
Figure 2:
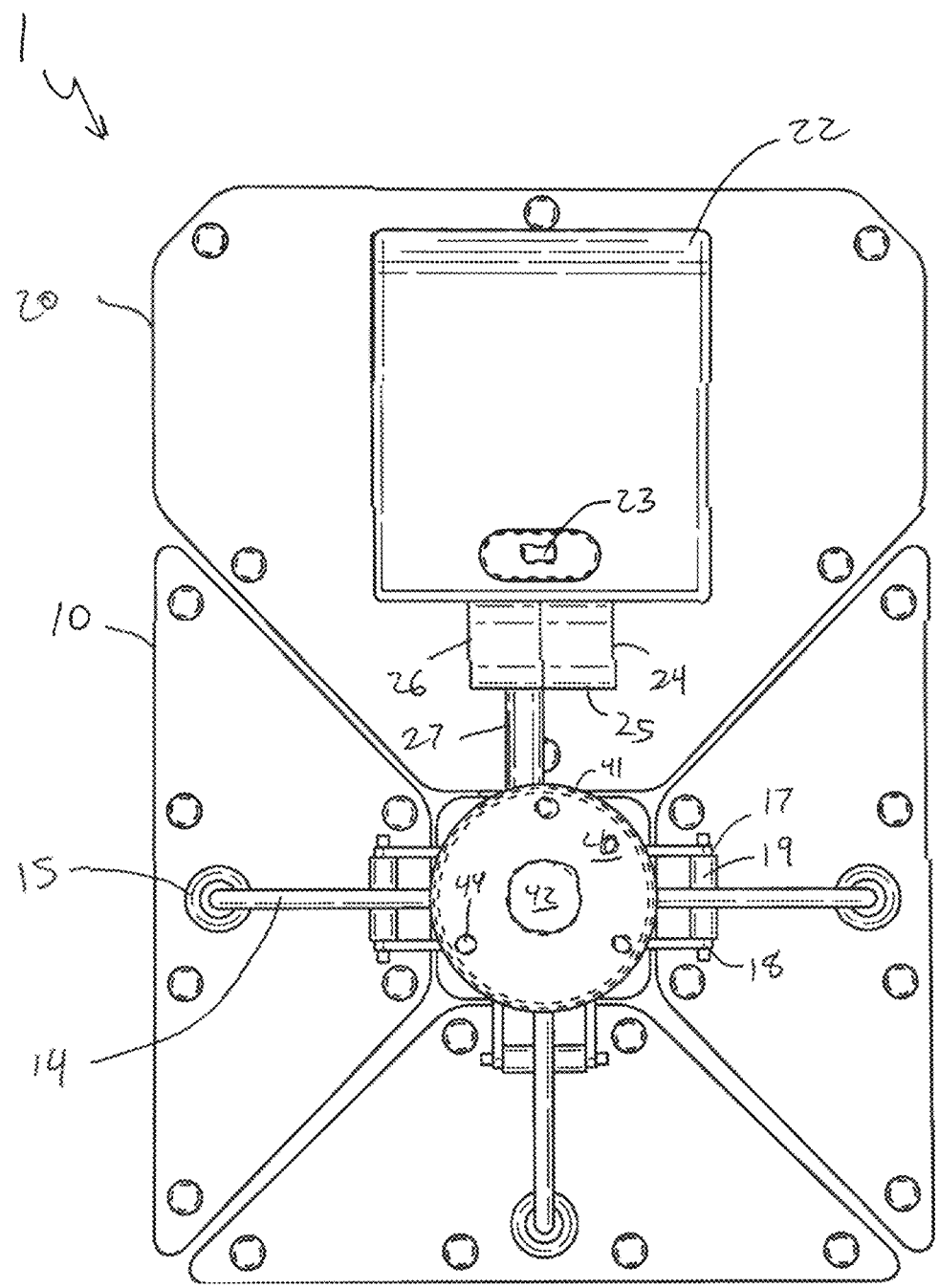
FIG. 2 is a rear view of the solar light of FIG. 1.
Figure 3:
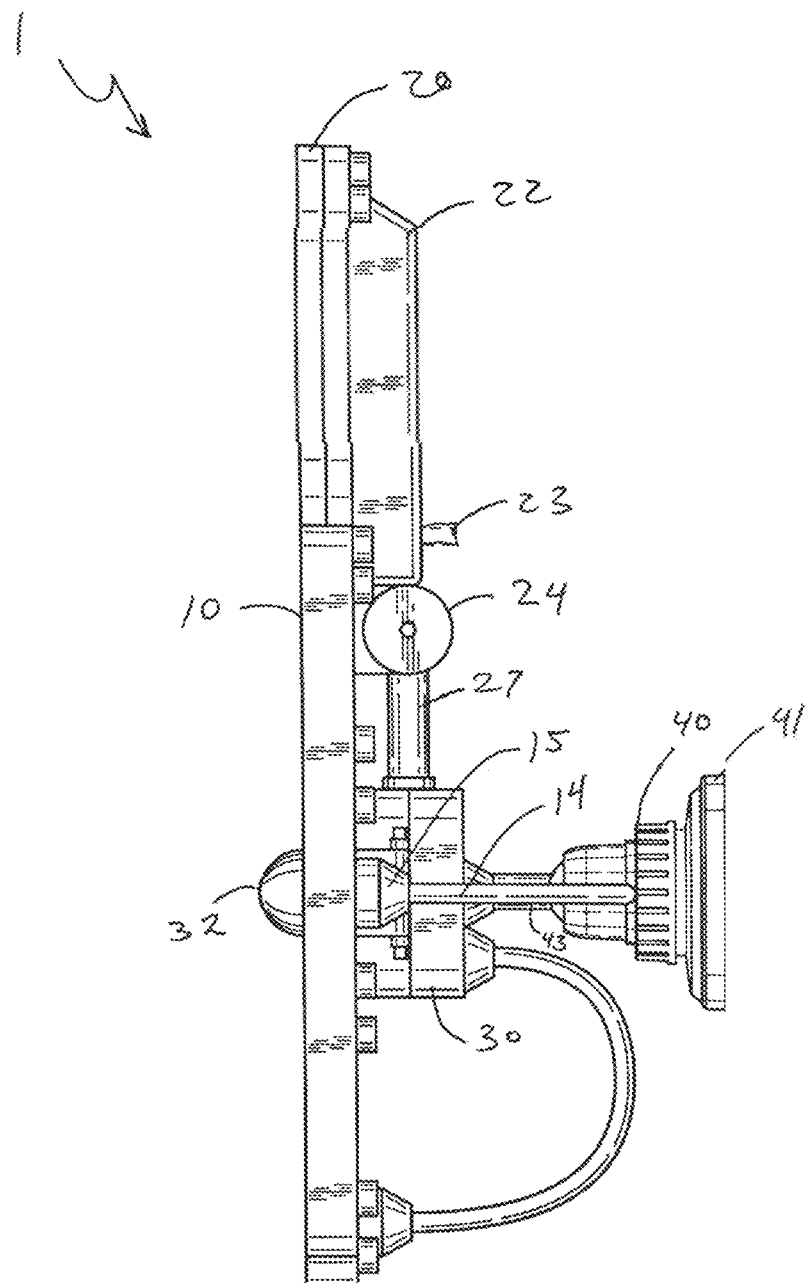
FIG. 3 is a side view of the solar light of FIG. 1.
Figure 4:
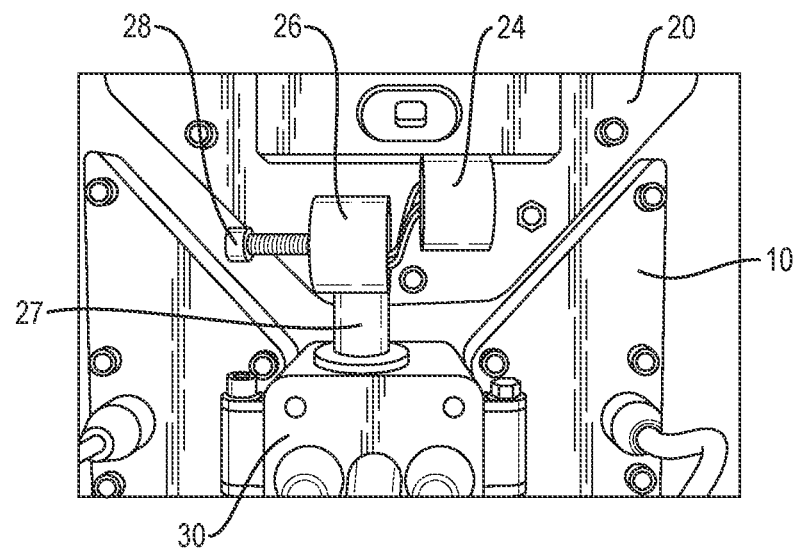
FIG. 4 is a detail view of the solar light of FIG. 1 showing the hollow hinge connection of the solar panel to the hub.
Figure 5:
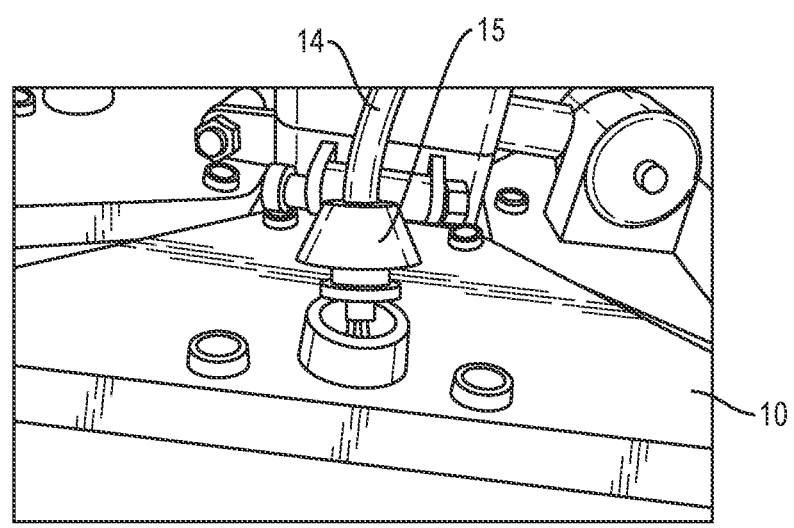
FIG. 5 is a detail view of the solar light of FIG. 1 showing the conduit connection of a light panel to the hub.
Figure 6:
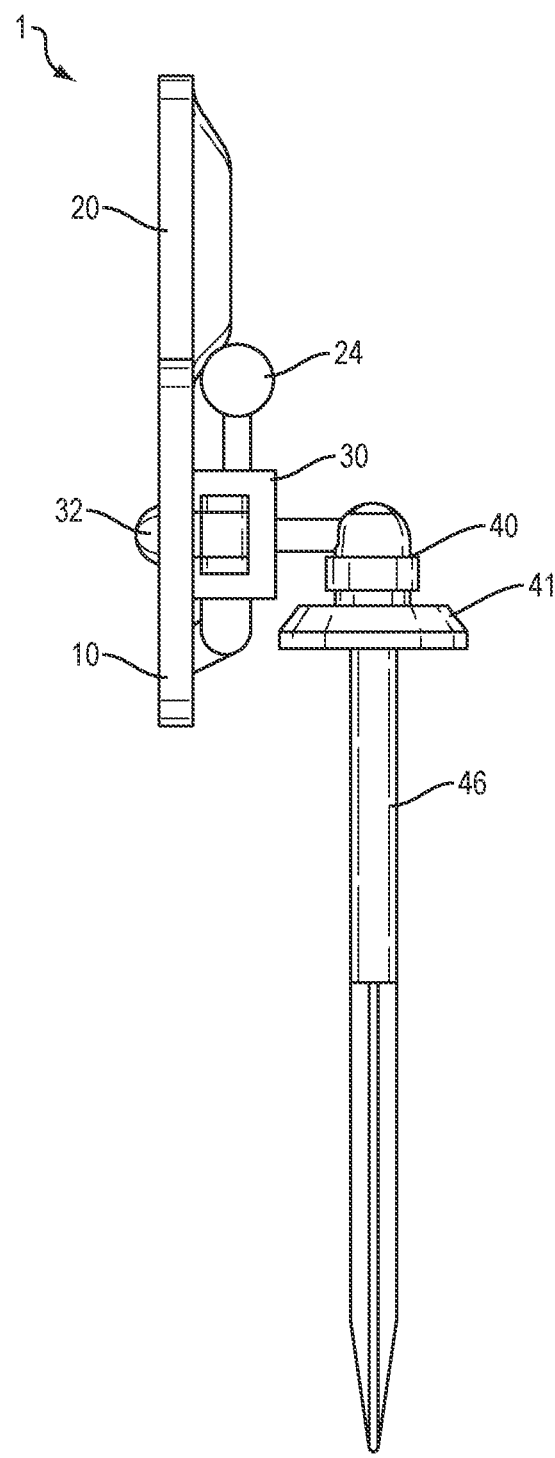
FIG. 6 is a side view of a solar light according to a non-limiting embodiment of the subject technology.

As shown in the non-limiting embodiment illustrated in the figures, solar-powered lighting apparatus 1 comprises multiple panels 10, 20 hingedly attached to a central hub 30. Light panels 10 (only one is numbered), which are of a similar construction have disposed therein light sources for emitting light, LEDs 11 (only one is numbered). LEDs 11 are disposed on printed circuit board (PCB) 12. PCB 12 is disposed within a compartment of light panel 10. Window 13 is disposed over the compartment and seals it from the environment, and is transparent or translucent for the passage of light emitted from LEDs 11.

Solar panel 20 has disposed therein solar cells 21 (only one is numbered). Solar cells 21 are disposed on a PCB (not shown) which is disposed within a front compartment of solar panel 20. The front compartment of solar panel 20 is sealed with a transparent resin material, or alternatively, is sealed with a transparent window similar to window 13. Housing compartment 22 is disposed on the rear surface of the solar panel 20. Device electronics and a rechargeable battery (not shown in the figures) are disposed within housing compartment 22, and a manual two-position ON-OFF switch 23 connected to the device electronics is disposed on the housing. Advantageously, solar panel 20 has a larger surface area than each of light panels 10.

In the non-limiting embodiment shown, hub 30 has a square profile with four sides, with a panel 10, 20 hingedly attached to each side of the hub 30. In other embodiments hub 30 may have other shapes or profiles. An infrared ("IR") emitter 31 and IR receiver 32 are disposed on a front surface of the hub.

Panels 10, 20 are independently positionable with respect to hub 30 due to their hinged attachment to hub 30, which attachment is adjustable by hand but is stiff enough due to friction in the hinges to maintain each panel 10, 20 in its position as adjusted. Panels 10 can thus be positioned to project light either downwardly, outwardly or downwardly and outwardly and can be angled at a plurality of angular adjustment positions with respect to the hub 30 in each of the positions. Panel 20 can thus be positioned to harvest solar energy efficiently. In a first position, the front surfaces of panels 10, 20 and the front surface of the hub 30 are approximately in the same plane, and the overall configuration of device 1 is approximately a rectangle, as shown in the figures.

The device electronics, battery, solar cells 21, switch 23, IR pair 31, 32 and LEDs 11 are electrically and operatively connected. Wiring for operatively connecting solar cells 21 and device electronics housed in housing compartment 22 to the remainder of the device 1 extends through the hinge 24 connecting the solar panel 20 to hub 30. Hinge 24 is a hollow hinge, and may comprise a first hollow half-cylinder 25 disposed on a lower portion of compartment 22 and a second hollow half-cylinder 26 connected to hub 30 by a hollow tube 27, two half-cylinders 25, 26 joined together by an axial bolt 28 to form a small hinge compartment, with the two half-cylinder 25, 26 being rotatable with respect to the other, about the axis defined by bolt 28. Passages from compartment 22 and half-cylinder 25, and from tube 27 to hub 30, are for the admission of wiring from the solar cells 21 and device electronics through the small hinge compartment to the remainder of the device 1.

The wiring further extends from hub 30 to the light panels 10 and the LEDs 11 on the respective light panels 10 through respective wire insulation sleeves or conduits 14 (only one is numbered) extending from hub 30 to light panels 10. Each conduit 14 is connected to an opening in hub 30 at a first end and extends to an opening in light panel 10, for passage of wiring from hub 30 to the respective light panel 10. A rubber boot 15 (only one is numbered) is provided at each end of the respective conduits 14 for firmly attaching to the panel 10 or hub 30. Each boot 15 has a passage therethrough for admission of wiring and the end of conduit 14, and a flange which is disposed within the panel 10 or hub 30 as applicable, for attaching and retaining boot 15 and conduit 14 in place. Because the wiring is passed from hub 30 to light panel 20 by these structures, the hinges 17 for attaching panels 20 to hub 20 may be of a simple construction as shown, having a bracket 18 attached to one member (hub 30 or panel 20) and a barrel 19 attached to the opposite member, which is received in the bracket 18 and attached by a throughgoing pin or bolt. It should be understood that in alternative embodiments, solar panel 20 may be mechanically and electrically connected to hub 30 by these means, and/or light panels 10 may be mechanically and electrically connected to hub 30 by means of a hinge like hinge 24 with half-cylinders 25, 26 as described above.

Mount 40 is connected to hub 30 for mounting the device 1 on a wall, ceiling, or other surface. In the embodiment shown, mount 40 comprises mounting bracket 41, which in turn comprises a socket 42. A mounting ball 43 is disposed on a rear surface of hub 30, ball 43 being received in the socket 42 for a rotatable and positionable connection of the hub 30 to the underlying surface. Bracket 41 is provided with holes 44 (one is numbered) for receiving mounting screws to mount bracket 41 to and underlying surface. Bracket 41 may also have stake socket 45 for receiving a landscape stake 46, for staking device 1 into the ground.

Under the control of the device electronics, solar energy is harvested by the solar cells 21 and stored in the rechargeable battery for powering the components of the device. When the IR pair 31, 32 detects motion, and the switch 23 is in the ON position, and the solar cells 21 do not detect ambient light above a predetermined base level, the device electronics turn the LEDs 11 on. When the IR pair 31, 32 has not detected motion for a predetermined period, or the switch 23 is in the OFF position, or the solar cells 21 detect ambient light above the predetermined base level, the LEDs 11 are powered off.

Conduits 14 may be made of any type of insulator known in the art, any type of plastic known in the art, including but not limited to thermoplastic elastomer (TPE), polyvinyl chloride (PVC), semi-rigid pvc (SR-PVC), plenum polyvinyl chloride (Plenum PVC), polyethylene (PE), polypropylene (PP), polyurethane (PUR), chlorinated polyethylene (CPE), or nylon. Conduits 14 may also be made of any type of rubber known in the art, including but not limited to thermoplastic rubber (TPR), neoprene (polychloroprene), styrene butadiene rubber (SBR), silicone, fiberglass, ethylene propylene rubber (EPR), natural rubber, chlorosulfonated polyethylene (CSPE), ethylene propylene diene monomer (EPDM). Boots 15 may be made of any type of plastic known in the art, including but not limited to thermoplastic elastomer (TPE), polyvinyl chloride (PVC), semi-rigid pvc (SR-PVC), plenum polyvinyl chloride (Plenum PVC), polyethylene (PE), polypropylene (PP), polyurethane (PUR), chlorinated polyethylene (CPE), or nylon. Boots 15 may also be made of any type of rubber known in the art, including but not limited to thermoplastic rubber (TPR), neoprene (polychloroprene), styrene butadiene rubber (SBR), silicone, fiberglass, ethylene propylene rubber (EPR), natural rubber, chlorosulfonated polyethylene (CSPE), ethylene propylene diene monomer (EPDM).

The respective bodies of light panel 10, solar panel 20, hub 30, mount 40 may be made of any type of plastic known in the art, including but not limited to thermoplastic elastomer (TPE), polyvinyl chloride (PVC), semi-rigid pvc (SR-PVC), plenum polyvinyl chloride (Plenum PVC), polyethylene (PE), polypropylene (PP), polyurethane (PUR), chlorinated polyethylene (CPE), or nylon. The main body 12 may also be made of any type of rubber known in the art, including but not limited to thermoplastic rubber (TPR), neoprene (polychloroprene), styrene butadiene rubber (SBR), silicone, fiberglass, ethylene propylene rubber (EPR), natural rubber, chlorosulfonated polyethylene (CSPE), ethylene propylene diene monomer (EPDM).

It is understood that the invention may be embodied in other forms without departing from the spirit thereof. Thus, the present examples and embodiments are to be considered in all respects as illustrative and not restrictive, and the invention is not to be limited to the details given herein.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A solar-powered lighting apparatus comprising:
   a central hub;
   a first panel, second panel, and third panel, each panel hingedly attached directly to the central hub;

a first PCB disposed in the first panel, a second PCB disposed in the second panel, and a third PCB disposed in the third panel;

a first array of LEDs disposed on the first PCB, a second array of LEDs disposed on the second PCB, and a third array of LEDs disposed on the third PCB;

a first conduit extending between the first panel and the hub, a second conduit extending between the second panel and the hub, and a third conduit extending between the third panel and the hub;

a fourth panel hingedly attached to the central hub by a hollow hinge;

an array of solar cells, electronics, a switch having an ON position and an OFF position, and a rechargeable battery disposed within the fourth panel; the array of solar cells electrically and operatively connected to the electronics and rechargeable battery to recharge the battery with harvested solar energy and to detect ambient light;

a motion detector disposed on the apparatus;

each of the respective arrays of LEDs operatively electrically and operatively connected to the electronics and rechargeable battery via wiring passing through each of the respective conduits and through the hollow hinge;

the device electronics configured to operate the apparatus such that when the motion detector detects motion, and the switch is in the ON position, and the solar cells do not detect ambient light above a predetermined base level, the device electronics turn the LEDs on, and when the motion detector has not detected motion for a predetermined period, or the switch is in the OFF position, or the solar cells detect ambient light above the predetermined base level, the LEDs are powered off.

2. The solar-powered lighting apparatus of claim 1 further comprising an adjustable mount attached to the hub.

3. The solar-powered lighting apparatus of claim 1 wherein the hollow hinge comprises a first hollow half-cylinder connected to the fourth panel and a second hollow half-cylinder connected to the hub, the first hollow half-cylinder second hollow half-cylinder rotatably connected to each other to form the hollow hinge.

4. The solar-powered lighting apparatus of claim 1 further comprising a landscape spike attached to the hub and configured to stake the apparatus to the ground.

5. The solar-powered lighting apparatus of claim 1 wherein the first panel, second panel, third panel, and fourth panel are independently positionable with respect to the hub.

6. The solar-powered lighting apparatus of claim 1 wherein the first panel, second panel, third panel, and fourth panel are positionable in a first position in which the overall configuration of the panels and hub is approximately a rectangle.

* * * * *